(12) United States Patent
Boyce et al.

(10) Patent No.: US 11,826,952 B2
(45) Date of Patent: Nov. 28, 2023

(54) STRUCTURAL METAMATERIALS COMPRISING INTERPENETRATING LATTICES

(71) Applicant: National Technology & Engineering Solutions of Sandia, LLC, Albuquerque, NM (US)

(72) Inventors: Brad Boyce, Albuquerque, NM (US); Benjamin C. White, Albuquerque, NM (US); Anthony Garland, Albuquerque, NM (US); Ryan Alberdi, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 317 days.

(21) Appl. No.: 17/189,074

(22) Filed: Mar. 1, 2021

(65) Prior Publication Data

US 2021/0316501 A1     Oct. 14, 2021

Related U.S. Application Data

(60) Provisional application No. 62/989,288, filed on Mar. 13, 2020.

(51) Int. Cl.
*B29C 70/00*     (2006.01)
*B32B 5/02*     (2006.01)
(Continued)

(52) U.S. Cl.
CPC ............ *B29C 64/129* (2017.08); *B22F 10/37* (2021.01); *B29C 44/357* (2013.01); *B29C 70/0035* (2021.05); *B33Y 10/00* (2014.12); *B33Y 70/10* (2020.01); *B33Y 80/00* (2014.12); *B22F 2301/35* (2013.01); *B22F 2999/00* (2013.01); *B29K 2105/251* (2013.01); *B29K 2277/00* (2013.01); *B29K 2995/0005* (2013.01); *B29K 2995/0025* (2013.01); *B29K 2995/0041* (2013.01); *B29K 2995/0094* (2013.01);
(Continued)

(58) Field of Classification Search
None
See application file for complete search history.

(56) References Cited

U.S. PATENT DOCUMENTS

2017/0181496 A1*   6/2017   Guyan .................. A43B 13/181

OTHER PUBLICATIONS

Yu, X. et al., "Mechanical Metamaterials Associated with Stiffness, Rigidity and Compressibility: A Brief Review," Progress in Materials Science, 2018, vol. 94, pp. 114-173.
(Continued)

*Primary Examiner* — Elizabeth Collister
(74) *Attorney, Agent, or Firm* — Kevin W. Bieg

(57) ABSTRACT

Multi-body interpenetrating lattices comprise two or more lattices that interlace or interpenetrate through the same volume without any direct physical connection to each other, wherein energy transfer is controlled by surface interactions. As a result, multifunctional or composite-like responses can be achieved by additive manufacturing of the interpenetrating lattices, even with only a single print material, with programmable interface-dominated properties. As a result, the interpenetrating lattices can have unique mechanical properties, including improved toughness, multi-stable/negative stiffness, and electromechanical coupling.

20 Claims, 15 Drawing Sheets

(51) Int. Cl.
*B29C 64/129* (2017.01)
*B33Y 10/00* (2015.01)
*B33Y 70/10* (2020.01)
*B22F 10/37* (2021.01)
*B33Y 80/00* (2015.01)
*B29C 44/34* (2006.01)
*B33Y 50/00* (2015.01)
*B29K 277/00* (2006.01)
*B29K 105/00* (2006.01)
*B32B 3/12* (2006.01)
*B32B 3/26* (2006.01)

(52) U.S. Cl.
CPC . *B32B 3/12* (2013.01); *B32B 3/26* (2013.01); *B32B 5/028* (2013.01); *B33Y 50/00* (2014.12)

(56) References Cited

OTHER PUBLICATIONS

Zok, F. W. et al., "Periodic Truss Structures," Journal of the Mechanics and Physics of Solids, 2016, vol. 96, pp. 184-203.

Chen, W. et al., "Stiff Isotropic Lattices Beyond the Maxwell Criterion," Science Advances, 2019, vol. 5, eaaw1937, 6 pages.

Messner, M. C., "Optimal Lattice-Structured Materials," Journal of the Mechanics of Physics and Solids, 2016, vol. 96, pp. 162-183.

Prashanth, K. G. et al., "Characterization of 316L Steel Cellular Dodecahedron Structures Produced by Selective Laser Melting," Technologies, 2016, vol. 4, 34, 12 pages.

Babaee, S. et al., "Mechanical Properties of Open-Cell Rhombic Dodecahedron Cellular Structures," Acta Materialia, 2012, vol. 60, pp. 2873-2885.

Horn, T. J. et al., "Flexural Properties of Ti6Al4V Rhombic Dodecahedron Open Cellular Structures Fabricated with Electron Beam Melting," Additive Manufacturing, 2014, vol. 1-4, pp. 2-11.

Hedayati, R. et al., "Fatigue Crack Propagation in Additively Manufactured Porous Biomaterials," Materials Science and Engineering C, 2017, vol. 76, pp. 457-463.

Roach, A. M. et al., "Size-Dependent Stochastic Tensile Properties in Additively Manufactured 316L Stainless Steel," Additive Manufacturing, 2020, vol. 32, 101090., 12 pages.

White, B. C. et al., "Interpenetrating Lattices with Enhanced Mechanical Functionality," Additive Manufacturing, 2021, vol. 38, 101741, 9 pages.

\* cited by examiner

Relative size

Relative Orientation

Periodic minimal surface

STRUCTURAL METAMATERIALS COMPRISING INTERPENETRATING LATTICES

CROSS-REFERENCE TO RELATED APPLICATION

This application claims the benefit of U.S. Provisional Application No. 62/989,288, filed Mar. 13, 2020, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to structural metamaterials and, in particular, to structural metamaterials comprising interpenetrating lattices.

BACKGROUND OF THE INVENTION

Metamaterials are artificially structured materials that derive their properties primarily from their engineered topology. See N. Engheta and R. W. Ziolkowski, *Metamaterials: physics and engineering explorations*, John Wiley & Sons (2006); A. Sihvola, *Metamaterials* 1(1), 2 (2007); and X. Yu et al., *Prog. Mater. Sci.* 94, 114 (2018). These architected materials, also known as programmable materials or lattices, can offer unique properties not found in natural bulk materials, such as electromagnetic cloaking, negative thermal expansion, or negative Poisson's ratio. See D. Schurig et al., *Science* 314(5801), 977 (2006); R. Lakes, *Appl. Phys. Lett.* 90(22), 221905 (2007); and K. Wojciechowski, *Phys. Lett. A* 137(1-2), 60 (1989). Structural metamaterials have sparked great interest in the additive manufacturing (AM) community because AM is often the only feasible production route for these structures. In turn, lattice metamaterials greatly expand the range of effective properties that can be produced on any given AM system. Most 3D printers can only print a single material; however, by incorporating lattices the achievable effective material properties are not single valued but can take on a wide range of values.

Advances in lattice materials have traditionally been driven by new unit cell topologies or by manufacturing advances that leverage unique materials and nano-scale effects to maximize performance. See D. Schurig et al., *Science* 314(5801), 977 (2006); R. Lakes, *Appl. Phys. Lett.* 90(22), 221905 (2007); K. Wojciechowski, *Phys. Lett. A* 137(1-2), 60 (1989); S. C. Han et al., *Adv. Mater.* 27(37), 5506 (2015); A. Garland et al., *Extreme Mech. Lett.* 40, 100847 (2020); R. Lakes, *Science* 235, 1038 (1987); J. Bauer et al., *Nat. Mater.* 15(4), 438 (2016); T. A. Schaedler et al., *Science* 334(6058), 962 (2011); J. U. Surjadi et al., *Adv. Eng. Mater.* 21(3), 1800864 (2019); and L. R. Meza et al., *Proc. Natl. Acad. Sci.* 112(37), 11502 (2015). While novel unit cells surely remain undiscovered and advanced topology optimization techniques are expanding this research field, significant progress can also be made by creatively arranging existing unit cell topologies to create inhomogeneous metamaterials. See S. Watts and D. A. Tortorelli, *Int. J. Numer. Meth. Eng.* 112(11), 1564 (2017); O. Sigmund, *Int. J. Solids Struct.* 31(17), 2313 (1994); and P. Coelho and H. Rodrigues, *Struct. Multidiscip. Opt.* 52(1), 91 (2015). This can be accomplished by density grading, or by incorporating multiple materials to access composite toughening mechanisms. See I. Maskery et al., *Mater. Sci. Eng. A* 670, 264 (2016); L. Wang et al., *Adv. Mater.* 23(13), 1524 (2011); and H. Jiang et al., *Addit. Manuf.*, 36, 101430 (2020). Hierarchical lattices with struts made of smaller lattices have also been used to increase specific strength and energy absorption, frequently by taking advantage of nano scale strengthening effects that occur in the smallest geometric building blocks. See L. R. Meza et al., *Proc. Natl. Acad. Sci.* 112(37), 11502 (2015); and X. Zheng et al., *Nat. Mater.* 15(10), 1100 (2016). Lattices with regions of mis-oriented cells or different unit cell topologies, analogous to the grains and precipitates of metals, can mitigate catastrophic failure by disrupting damage localization. See M.-S. Pham et al., *Nature* 565(7739), 305 (2019); O. Al-Ketan et al., *J. Mech. Behav. Biomed. Mater.* 102, 103520 (2020); and R. Alberdi et al., *Mater. Des.*, 108883 (2020). Tuning of elastic properties has also been accomplished by introducing randomness to the unit cell design, or by combining hard and soft unit cells. See M. Mirzaali et al., *Appl. Phys. Lett.* 111(5), 051903 (2017); and M. Mirzaali et al., *Appl. Phys. Lett.* 113(24), 241903 (2018). These lattices combine multiple materials, length scales, or topologies, but are all composed of a single continuous body. A few multi-body structures have been demonstrated including chain-like structures, a steel wool like "metallic rubber", double gyroid nano-lattices, and origami lattices, however in these cases their multi-body nature generally results as a byproduct of their manufacturing process rather than an explicitly architected topology. See S. V. Taylor et al., Architectured Chain Lattices with Tailorable Energy Absorption in Tension, arXiv preprint arXiv:2008.07402 (2020); H. Ao et al., *Model. Simul. Mater. Sci. Eng.* 13(4), 609 (2005); S. N. Khaderi et al., *Extreme Mech. Lett.* 10, 15 (2017); and S. Kamrava et al., *Sci. Rep.* 7(1), 1 (2017).

SUMMARY OF THE INVENTION

The present invention is directed to metamaterials comprising two or more interpenetrating lattices (IPLs) that are not physically connected but interact either through a defined separation distance or through contact. The interpenetrating lattices enable new topologies with unique properties governed by interactions between the different lattices. Unlike traditional lattices, IPLs are physically discontinuous multi-body metamaterials without a direct material connection between the constituent lattices. As a result, IPLs can exhibit unique, tailorable properties unachievable with traditional single component lattices, including new interface dominated behaviors, composite like toughening, tunable anisotropy, and unusual couplings of properties. A key feature of interpenetrating lattices is their lack of direct material connection, which forces loads to transfer entirely through friction and contact, resulting in increased resistance to transmission of thermal, electrical, vibration, and impact loadings. As examples of the invention, several unusual behaviors of IPLs were demonstrated experimentally including a stress-resistivity coupling that is a million times more sensitive that commercial strain gauges, and toughened, energy-dissipating IPLs which are far more deformable than their constituent lattices. With this new interpenetrating lattice construct, it is possible to imagine a wide range of new functions from damage sensing materials, to vibration isolation, and adaptive particle filtration.

BRIEF DESCRIPTION OF THE DRAWINGS

The detailed description will refer to the following drawings, wherein like elements are referred to by like numbers.

FIG. 2A was printed by polyjeting (Objet J286). FIG. 2B was printed using MultiJet fusion (HP580). FIG. 2C was printed using laser powder bed fusion (ProX DMP 200). FIG. 2D was printed using multiphoton lithography (Nanoscribe GT).

FIG. 6A shows a BCC+Fiber sliding IPL showing high tensile elongation. FIG. 6B is a graph showing cyclic frictional energy dissipation.

FIG. 7B shows a tetrakis cube and truncated octahedron dual lattice pair. FIG. 7C shows a tetrakis cube and modified re-entrant truncated octahedron. FIG. 7D shows zero-dimension spheres placed inside a 3D FCC unit cell. FIG. 7E shows a 2D sheet based gyroid and two 1D strut/node based chamfered rhombohedrons. FIG. 7F shows simple tetragonal cells with different relative orientations. FIG. 7G shows four BCC cells nested inside a larger tetragonal cell.

FIG. 8A shows multiaxial loading of RD+FCC lattices with different boundary configurations in each axis. FIG. 8B shows a FCC lattice with pseudo RD precipitates. FIG. 8C shows IPLs connected in series. FIG. 8D shows RD and FCC structures serving different functions but occupying the same space.

DETAILED DESCRIPTION OF THE INVENTION

Figure 1A:
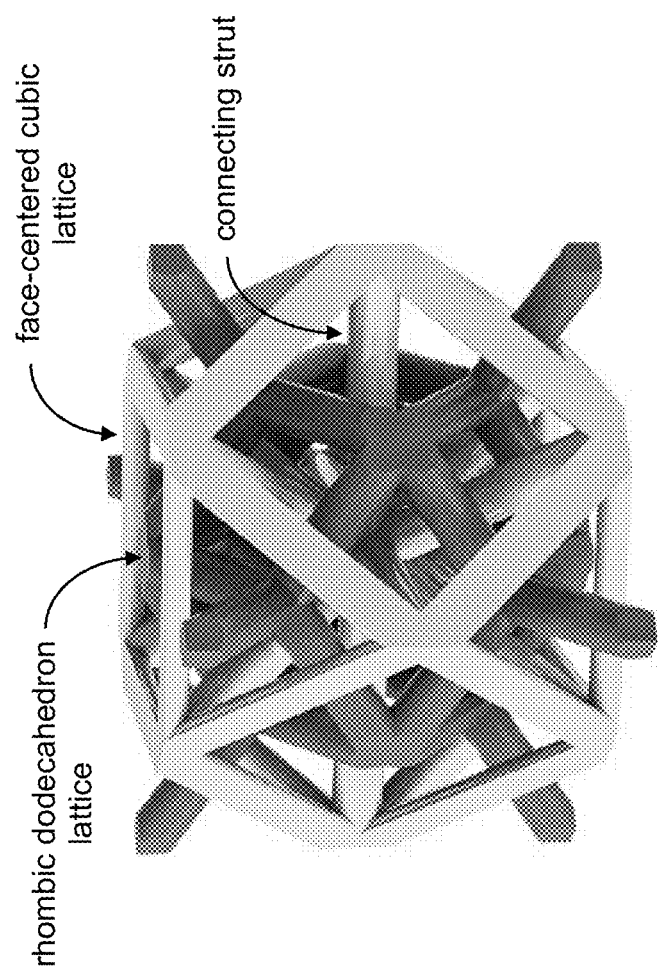
FIG. 1A is a CAD model of the FCC+RD unit cell.

The present invention is directed to interpenetrating lattices (IPLs) comprising two or more directly engineered but physically disconnected lattices (i.e., the lattices are separate physical bodies) that interweave or interpenetrate through the same volume. By directly designing IPL topologies, the properties of each constituent, or component lattice can be controlled, and more importantly the interactions between the two lattices. The geometry underpinning IPLs comes from the ancient concept of dual polyhedra which appears tangentially in Euclid's *Elements* book VIII, and directly in the apocryphal books XIV and XV. See J. H. Richard Fitzpatrick, *Euclid's Elements of Geometry* (2008); and H. S. M. Coxeter, *Regular Polytopes*, 3rd ed., Dover Publications, New York (1973). Dual polyhedra are reciprocal pairs of polyhedra where the vertices of one polyhedron correspond to the faces of the other, and both polyhedra share the same symmetries. See H. S. M. Coxeter, *Regular Polytopes*, 3rd ed., Dover Publications, New York (1973). The five platonic solids and their duals, illustrated by Kepler in *Harmonices Mundi*, show these relationships clearly, and the matchstick representations of the inscribing polyhedra are easy to visualize as strut based lattices. See J. Kepler, *Ioannis Keppleri Harmonices mundi libri V* (1619). Crystallographers, drawing from the same geometry refer to these constructions as Wigner-Seitz cells, the primitive space-filling volume associated with each crystal lattice site. See E. Wigner and F. Seitz, *Phys. Rev.* 43(10), 804 (1933). For example, the Wigner-Seitz cells for the face-centered cubic (FCC) and body-centered cubic (BCC) crystal lattices are created by placing planes perpendicular to and at the midsection of the lines connecting adjacent lattice sites. See N. W. Ashcroft and N. D. Mermin, *Solid State Physics* (saunders college, philadelphia, 1976), Appendix N 166 (2010). Lattice metamaterial researchers in turn adapt structures and naming from crystallography, as well as directly from classical geometry, making the concept of dual or interpenetrating lattices only the latest in a long line of adaptations. See F. W. Zok et al., *J. Mech. Phys. Solids* 96, 184 (2016).

While the IPL concept is a remarkably simple adaptation of ancient geometric principals, the advent of additive manufacturing (AM) allows these concepts to be turned into reality and begin to capitalize on their increased design freedom. Though IPLs seem geometrically complicated at first glance, they can be readily manufactured in many materials using a broad range of existing AM processes, from hobbyist 3D printers to microfabrication and production-scale systems. The geometric features of interpenetrating lattices and how these features can be tailored to produce structural metamaterials with enhanced mechanical functionalities are described below. Several specific applications and topologies are demonstrated as proofs of concept.

Examples: RD+FCC and BCC+Fiber Interpenetrating Lattices

Figure 1B:
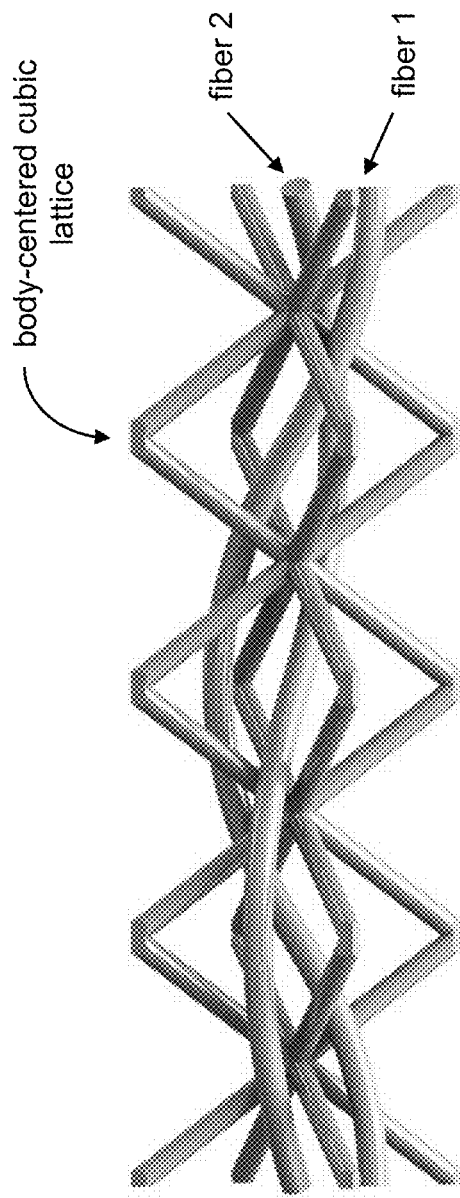
FIG. 1B is a CAD model of the BCC+Fiber unit cell.
Figure 1D:
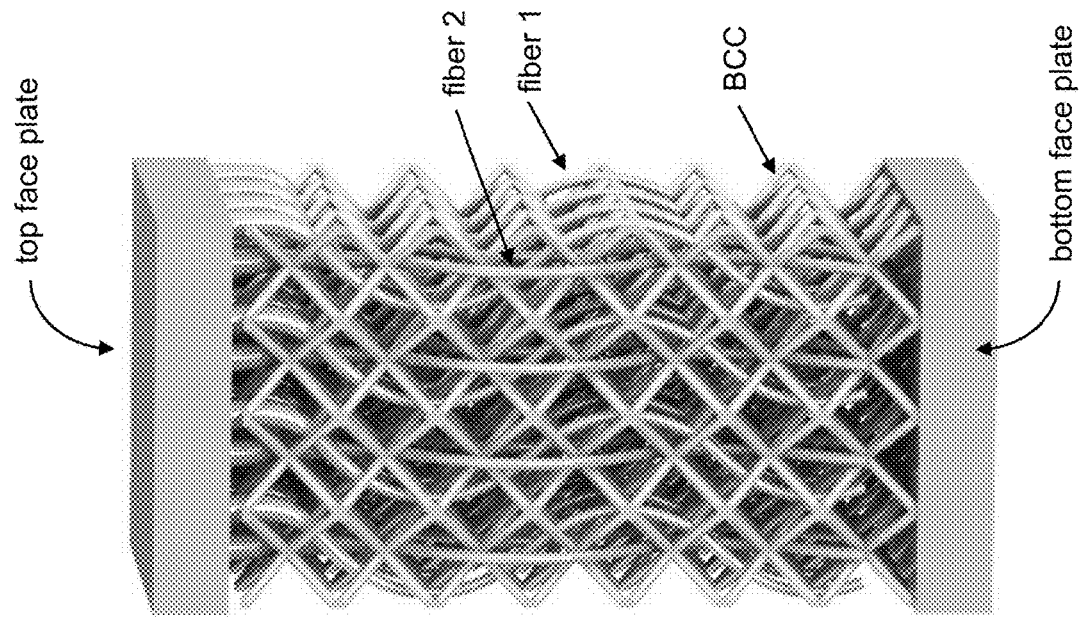
FIG. 1D is an illustration of a BCC+Fiber lattice where the BCC lattice attaches only to the bottom face plate and the fibers attach only to the top face plate, representing an A-B configuration.

As examples of the invention, the mechanical characteristics of two specific lattice pairs: the dual rhombic dodecahedron/face-centered cubic (RD+FCC) IPL, and a body-centered cubic/fiber (BCC+Fiber) IPL, shown in FIGS. 1A and 1B, were examined. The RD+FCC pairing is thought to provide a pedagogical system for structural performance: the FCC lattice, otherwise known as the octet truss, is a widely studied mechanical metamaterial with high nodal connectivity (12-fold) and correspondingly high specific strength and specific stiffness; the RD lattice is the geometric reciprocal to FCC lattice and has itself been studied quite extensively. See W. Chen et al., Sci. Adv. 5(9), eaaw1937 (2019); M. C. Messner, J. Mech. Phys. Solids 96, 162 (2016); K. G. Prashanth et al., Technologies 4(4), 34 (2016); S. Babaee et al., Acta Mater. 60(6-7), 2873 (2012); T. J. Horn et al., Addit. Manuf. 1, 2 (2014); and R. Hedayati et al., Mater. Sci. Eng. C 76, 457 (2017). In contrast, the BCC+Fiber topology is a completely new structure that demonstrates the diversity of possible IPL architectures beyond reciprocal polyhedra. The BCC+Fiber IPL is comprised of a traditional BCC lattice, through which sinusoidal fibers, oscillating in a plane with a wavelength of four BCC cells, are woven. Two fibers, labeled fiber 1 and fiber 2 in FIG. 1B, are offset by 1 BCC unit cell to avoid nodal fiber-fiber intersections, and the planes containing the fibers are oriented 90 degrees from each other. This design was inspired from the interweaving of molecular chains in polymers, which unravel and slide across each other when deformed. In the initial state of the lattice shown in FIG. 1D, the BCC and Fiber lattices are completely disconnected, and each individual fiber is only connected to its neighboring fibers via the top plate. It should be noted that the BCC+Fiber lattice is an intuition-based design, created without design optimization tools, for the purpose of illustrating potential design freedoms, and unusual mechanical response.

Each interpenetrating lattice pairing can be arranged in series, parallel, or some combination thereof, as well as more complex internal arrangements. Under uniaxial loading a total of four unique principal exterior boundary configurations exist, shown in FIG. 1C. In each of these boundary arrangements, lattice A, lattice B, or both lattices are exposed to the external load, and which lattices are externally loaded determines how or if loads are transferred between the lattices. These loading arrangements are denoted as A-B, A-A, A-AB, or AB-AB in FIG. 1C, indicating which component lattice is exposed to external loading from the left and right side (or top and bottom in FIG. 1D). For the sake of brevity, only the two most extreme cases were considered, the A-B arrangement in which all load transfer occurs from interfacial interactions within the IPL body, and the AB-AB arrangement in which both lattices are exposed to the external loading on both sides of the structure.

RD+FCC lattices with 20% total relative density were constructed as 1:1 combinations by mass of the two lattice components, while the standalone RD and FCC lattices were designed to have the same strut sizes and 20% total relative density. Strut size was held constant between lattices within each experimental set and is used as the characteristic measure of the lattice size because previous work has shown that surface roughness causes a significant reduction in effective properties of AM features as the feature size decreases, making comparisons between different lattices with different strut diameters inherently convoluted. See A. M. Roach et al., Addit. Manuf. 32, 101090 (2020). Accordingly, the characteristic cell size was varied to achieve the strut diameters and relative densities listed in Table 1. The BCC+Fiber lattices and BCC control lattice were designed in a similar way, with a relative density of 10%, though the mass ratio of BCC to fiber was approximately 3:1. All interpenetrating lattices were compared to their single component control lattices at equal total relative density. All RD+FCC, RD, and FCC lattices samples were 5×5×5 cell cubes while the BCC+Fiber lattice samples were 4×4×6 cells.

To demonstrate platform independent printability, the RD+FCC lattices were manufactured with a polyjet process (Objet 30 from Stratasys Ltd.), multi-jet fusion process (Jet Fusion 580 from HP Inc.), a 316L stainless steel laser powder bed fusion (LPBF) printer (ProX DMP 200 from 3D systems), and multiphoton lithography (Nanoscribe GT from Nanoscribe Inc.). The basic design of the lattices remained the same for all printing processes; however the size of the lattices was scaled linearly to best suit the AM platforms on which they were made, with strut sizes for the various processes listed in Table 1. Mechanical testing was carried out on polyjet printed lattices made from Vero™ White, where the support material had been dissolved in a 3% potassium hydroxide solution. Electrical conductivity measurements were made on a 316L stainless steel RD+FCC lattices, which were printed with face plates on both sides of the lattices so loads could be applied more evenly, and resistance more easily measured. For bare interpenetrating lattices not attached to face plates, the relative motion of the two lattices are unconstrained. Face plates, on the other hand, provide a constraining attachment that can alter local interactions depending on the configuration. In the A-B configuration the plates are each only attached to one of the lattices: one plate attached to lattice A on one side and the opposing plate attached to lattice B. While the plates constrain the relative deformation of their respective lattice in the vicinity of the attachment, the two lattices are still free to move relative to each other, although the attached lattice benefits from localized stiffening provided by the supporting plate. In the AB-AB configuration, adding plates directly connects the two lattices: both lattices are attached to both plates. As a result, in the vicinity of the attachment point, the two lattices are constrained to prevent relative motion. If bounding plates were not used, the relative deformation of two lattices would still be somewhat constrained by frictional contact with the loading platens.

FIGS. 2A-D show 5×5×5 RD+FCC lattices printed via polyjet, multi jet fusion, laser powder bed fusion and multiphoton lithography processes, respectively. The manufacturing constraints for interpenetrating lattices are identical to individual single component lattices, with the additional constraint that minimum feature gaps must be maintained between the two lattices. Minimum feature gaps vary by AM technique, but they are generally readily achievable for IPLs below ~30% total relative density, which includes most lattice applications. See I. J. Gibson and M. F. Ashby, Cellular Solids: Structure and Properties, $2^{nd}$ Ed. Cambridge (1997).

Characterization of Exemplary IPLs

Tension and compression tests were performed in displacement control at a constant strain rate of $5\times10^{-3}$ s$^{-1}$ on an electromechanical load frame. Three BCC+Fiber and BCC samples tested in tension, and three each of the FCC, RD, and RD+FCC lattices tested in compression. Cyclic testing was performed in displacement control at 0.2 Hz, with a load ratio, R=0 and $\varepsilon_{max}$=25% for the BCC+Fiber IPL, and $\varepsilon_{max}$=5% for the BCC lattice. The strain amplitudes were chosen so as to result in nearly equivalent peak stresses of approximately 0.15 MPa. Electrical resistivity measurements were conducted on the 316L RD+FCC lattices using a Keithley 2450 four-point probe clipped to the top and bottom plates. These clip probes allowed for axial loads to be applied without affecting the contact resistance at the electrodes. While the bulk resistivity of laser powder bed fusion 316L can vary from $10^{-7}$ to $10^{-5}$ Ω-m depending on porosity, a more appropriate reference is the effective resistivity of both the RD and FCC lattices at 20% density, measured in the present study to be in the range of $2$-$3\times10^{-5}$ Ω-m. See K. A. Ibrahim et al., *Mater. Des.* 106, 51 (2016).

Figure 3A:
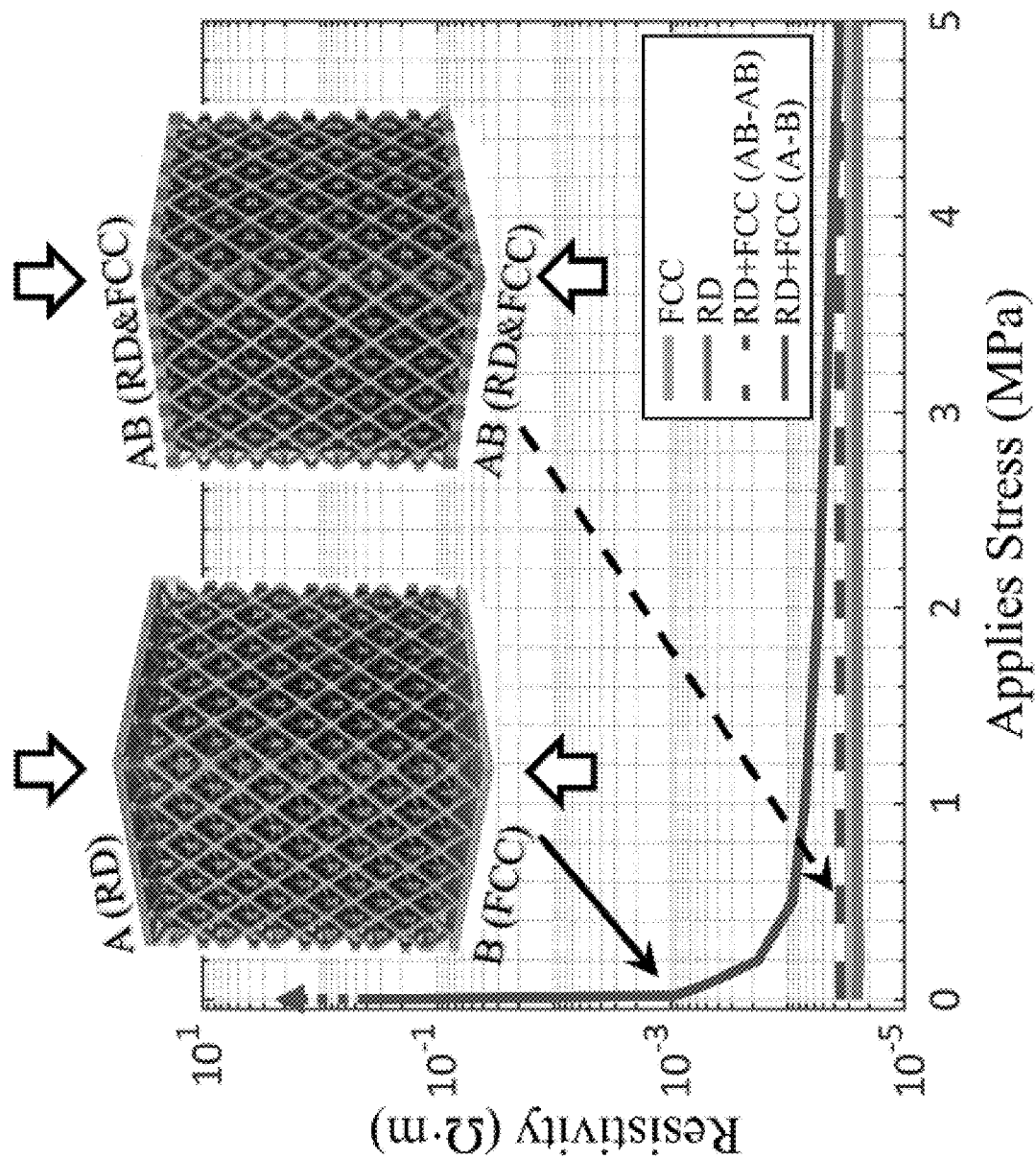
FIG. 3A is a graph of electrical resistivity as a function of stress for AM 316L RD+FCC IPLs in both the A-B and AB-AB configurations with the RD and FCC sublattices overlain with false color.

In a first demonstration, shown in FIG. 3A, the potential of a 316L RD+FCC IPL to act as a force sensor was evaluated. This demonstration clearly illustrates the role of boundary arrangements: A-B vs. AB-AB as described in FIG. 1C. When the constituent lattices in an IPL were loaded simultaneously in the AB-AB configuration, both lattices carried mechanical load and current independent of each other, and their electrical and elastic properties were the parallel superposition of the two individual lattices. In both the AB-AB IPL configuration, and the single component lattices, there is a direct path of conduction through the body that does not require contact. However, in the A-B configuration the constituent lattices were initially separate from each other, so the electrical conductivity across the IPL from boundary A to boundary B was zero. As the two lattices contacted each other under mechanical load, current was forced to travel across the contact interface between the two lattices, resulting in higher electrical resistance, and stress-dependent resistivity. This nonlinear stress dependent resistivity is thought to result from an increasing number of contact points, and then from increasing Hertzian contact area at each contact point as the applied stress is increased. While in an idealized IPL all struts would initiate contact simultaneously and equally, it is reasonable to expect that manufacturing imperfections would result in non-uniform initial contact. Accordingly, at low loads with only partial contact engagement, the nonlinear resistivity is expected to depend on the number of unit cells, as the number of contact points increase. Once full contact has been established, however, the resistivity would be size independent as in traditional materials. Such a scaling behavior is expected to depend on the surface roughness and geometric tolerance of the manufacturing process. Converting from stress to strain gives a strain sensitivity factor on the order of $\sim 10^6$, six orders of magnitude more sensitive than the gauge factor of typical strain gauges. Furthermore, unlike a strain gauge which is externally applied to a structural member, an IPL can be the structural member, as it is capable of simultaneously bearing load and sensing across continuous 3D space, similar to methods used with carbon fiber composites. See J. Abry et al., *Compos. Sci. Technol.* 59(6), 925 (1999). This behavior can also be leveraged purely as a non-structural sensor, potentially acting similar to existing devices, such as strain gauges, load cells, and potentiostats. The two lattices are subjected to body forces such as gravity and thus can contact surreptitiously; this issue can be mitigated by taring the conductivity arising from gravitational contact, or by attaching support bodies that hold the two lattices initially out of contact (as in the case of a linear variable differential transformers, or traditional electronic mass balances).

Figure 3B:
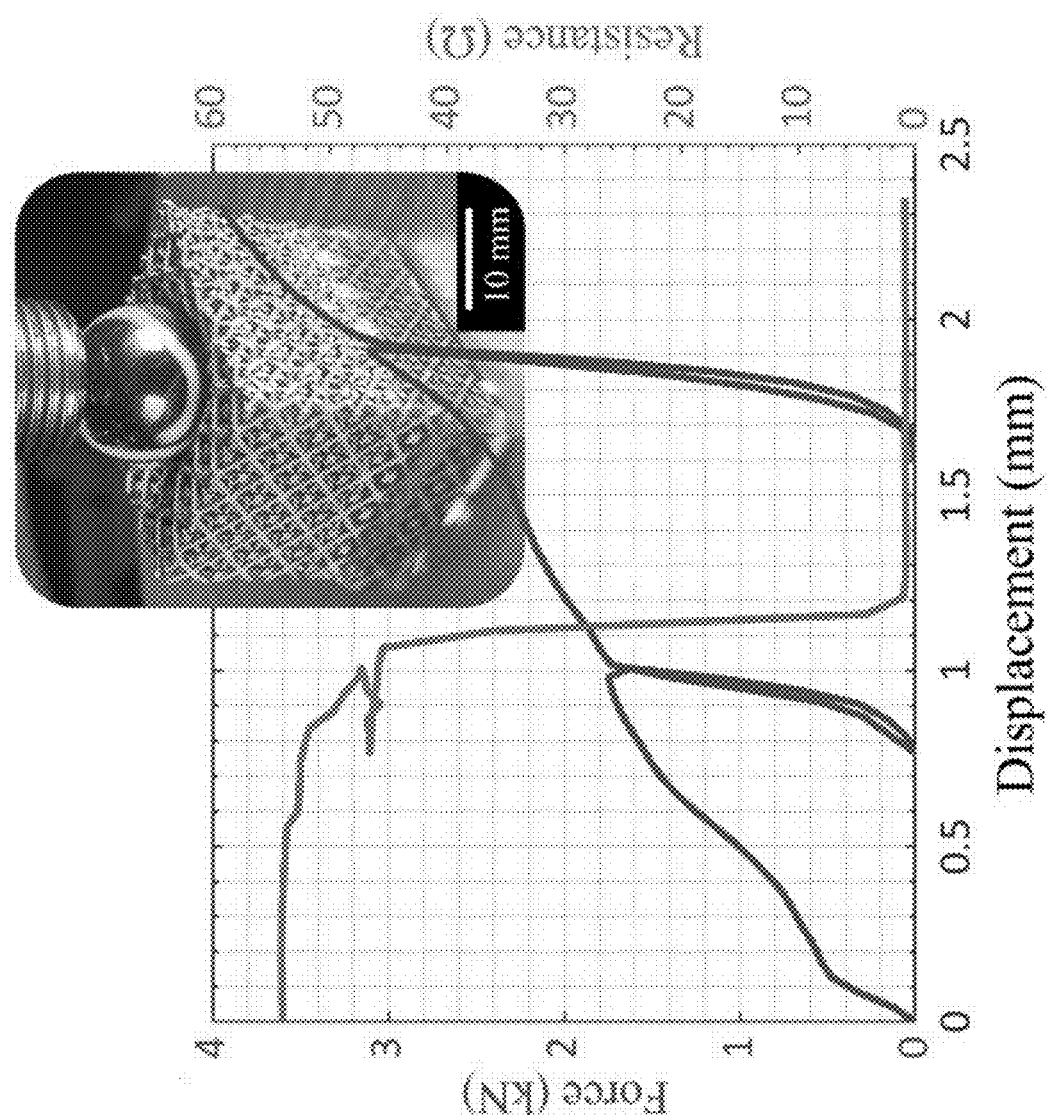
FIG. 3B is a graphic demonstration of plastic damage detection in an AM 316L RD+FCC IPL.

The RD+FCC can also serve as a plastically-deforming damage sensor, as shown in FIG. 3B. A RD+FCC lattice in the AB-AB configuration with no attachment plates was used to demonstrate this. To initially hold the lattices separate, the bottom two layers of unit cells were encased in non-conducting epoxy (inset image in FIG. 3B). A 16-mm diameter glass sphere was driven into the freely exposed AB top surface to simulate realistically complex, multiaxial damage scenario, while being easily repeatable in the laboratory. In the initial configuration, the electrical resistance from lattice A was ideally infinite as the two lattices were nominally held separate by non-conducting epoxy; however due to imperfections in the setup, the initial resistance was not infinite, but acceptably large (50 ohms). As the glass sphere was displaced into the IPL, as shown in the inset of FIG. 3B, the resistance at first did not change (displacement 0-0.5 mm). However, as the sphere indented beyond 0.5 mm, the resistance dropped progressively. This 0.5 mm onset of resistance change is comparable to the intended separation distance or 'gap' between the two lattices and is an indication that the lattices began to make substantial contact at that point. By a displacement of 1.2 mm, the resistance was near zero, an indication that substantial plastic contact had been formed between the two lattices. This low resistance was maintained even after the applied force was removed, because the plastic deformation is irreversible. While elastic damage detection as described in the previous section can be achieved using devices such as strain gauges, it must be measured concurrent with the applied load. Plastic damage detection is a more difficult problem but has the advantage of being able to be measured after the load has been removed. Thus, the damage sensor could serve as a passive electrically-inspectable component without the burden of active electronic sensing, providing an electrical indication of damage during maintenance or after potentially damaging events. While this demonstration focused on a single instantiation of a damage sensor, it is possible to envision altering the geometry of the two lattices to design different damage sensors. For example, the gap between the lattices can control the degree of strain necessary to induce a resistance change, while the topology and density of the lattices can be varied to control the strength/stiffness of the lattices and thus the force necessary to achieve contact.

Figure 4A:
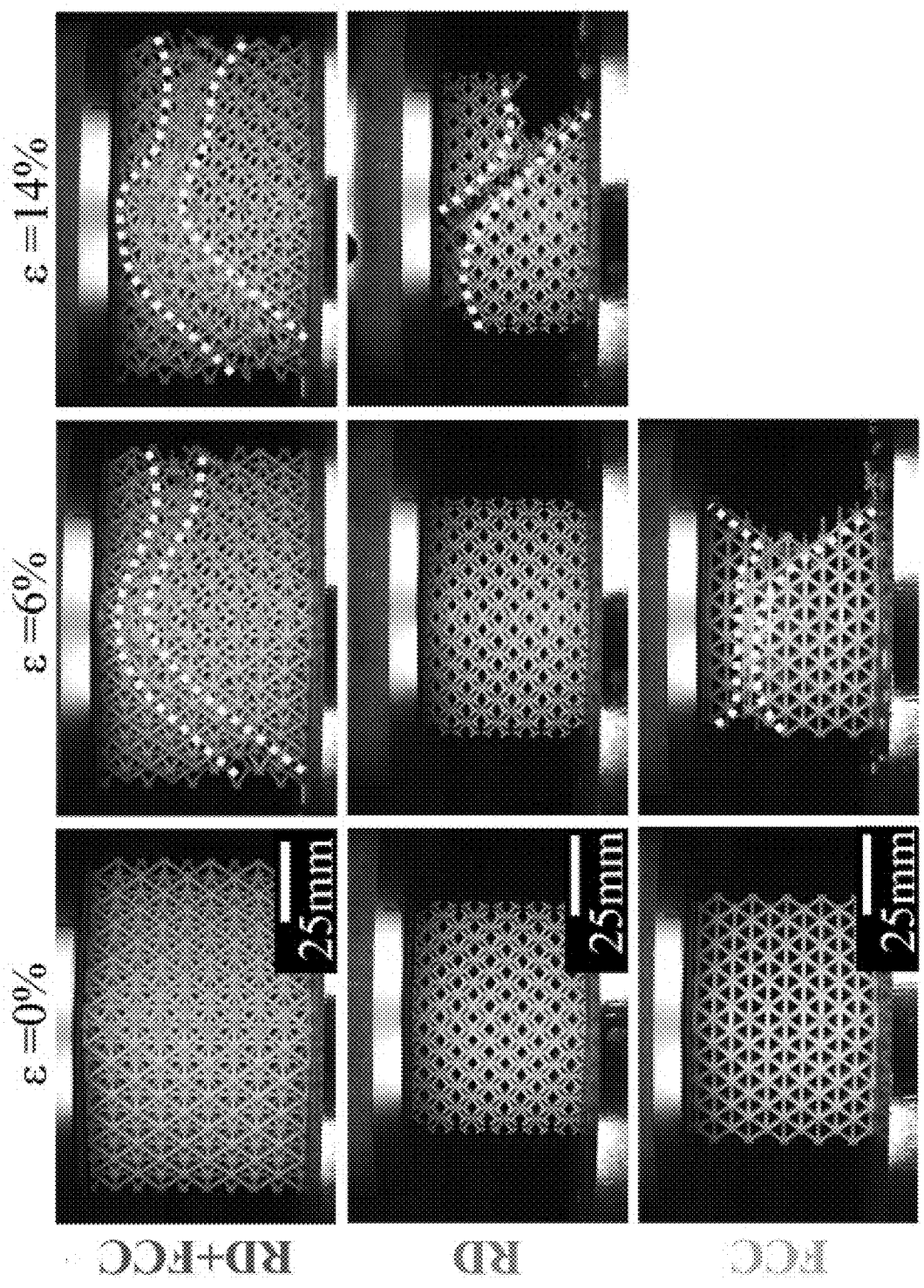
FIG. 4A shows images of lattice damage as a function of increasing strain for the FCC and RD lattices, and their interpenetrating composite, all of 20% total relative density.
Figure 4B:
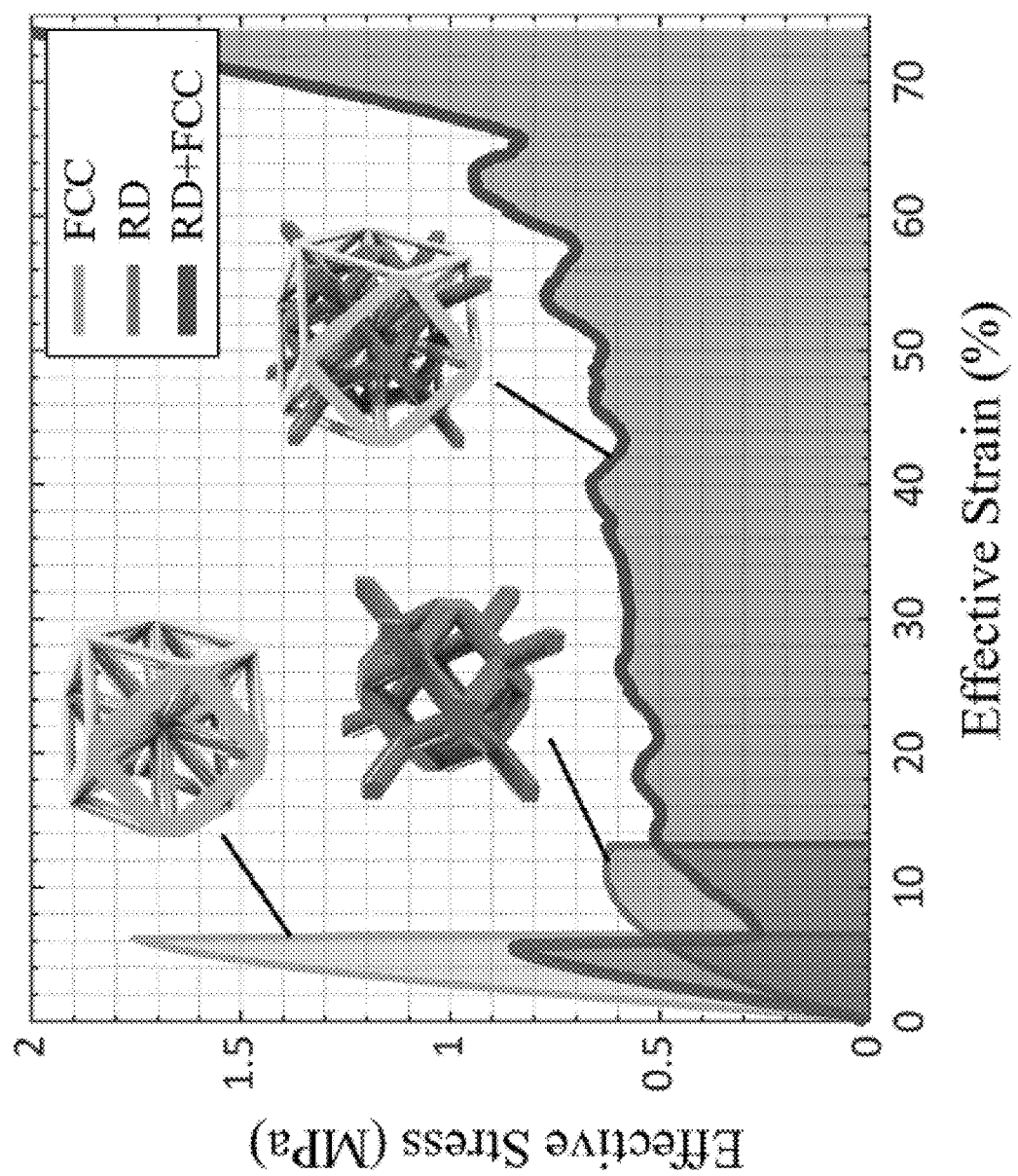
FIG. 4B is a graph of stress-strain response for the RD+FCC IPL, and its constituent FCC and RD lattices.

IPLs can also provide toughening and tailorable mechanical energy absorption, as shown in FIGS. 4A and 4B. In this case, a 20% total relative density RD+FCC lattice was printed in the photocuring polymer Vero White and subjected to static compression. For comparison, control experiments were performed on individual RD and FCC lattices, also at 20% relative density. In the AB-AB configuration, the RD and FCC lattices were loaded simultaneously, and initially operated independently of each other, exhibiting elastic properties that were the superposition of the constituent lattices. On their own the FCC and RD lattices show different elastic moduli and yield strains, but they both suffered from a catastrophic failure where shear bands, outlined by the dotted lines in FIG. 4A, propagated through the entire lattice and the load dropped to zero. When combined, however, the differences in individual properties produce a composite that did not suffer a total initial failure but rather redistributed the load, allowing the IPL to function up to densification and absorb six times more energy than the individual RD and FCC lattices. As shown in FIG. 4B, as damage in the FCC lattice exceeded that occurring in the RD lattice, the two lattices made contact, causing a redistribution of load away from the local failure point in the FCC lattice. The different mechanical properties of the two lattices ensure that failure in one occurs at a different strain (time) than the other, so that load redistribution can be achieved without total failure. If the two lattices had the same mechanical response, this mechanism could still operate, but only if failure in the two lattices occurred in different locations. Such toughening can also be achieved to some extent in contiguous lattice structures with complex hierarchical features and corresponding heterogeneity in mechanical properties (e.g., M.-S. Pham et al., *Nature* 565(7739), 305 (2019)), however in IPLs, each lattice can operate quasi-independently prior to engagement, and the toughening behavior can benefit from additional dissipation modes such as inter-lattice friction. Three of the FCC+RD lattices were tested in a similar manner, confirming that this arrangement consistently prevented catastrophic failure, whereas the single FCC and RD lattices always suffered total failure due to the brittle nature of the photocuring polymer from which they were made.

Figure 5B:
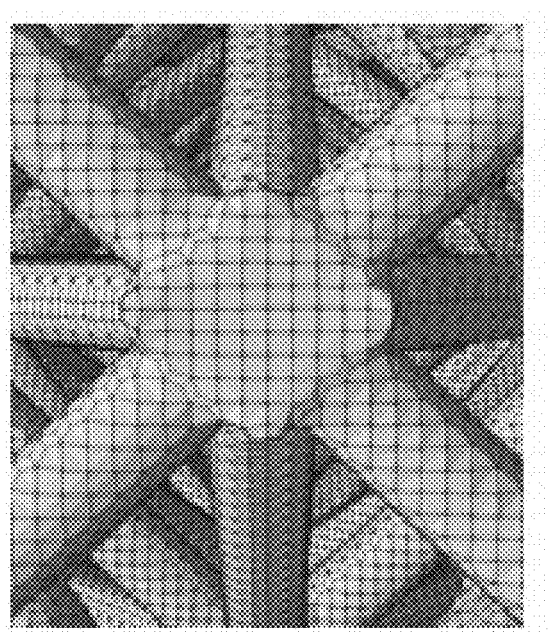
FIG. 5B shows the finite element mesh density at an FCC node.
Figure 5A:
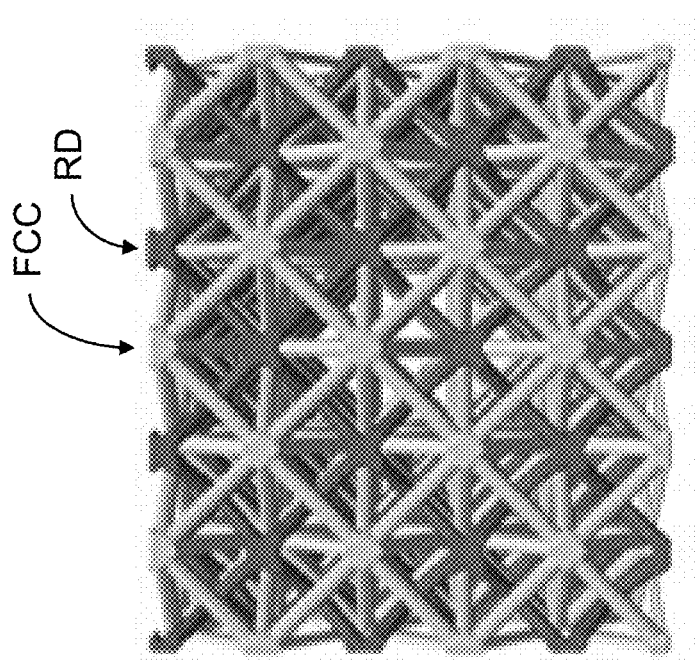
FIG. 5A is a CAD model of a 3×3×3 RD+FCC IPL.
Figures 5C, 5D:
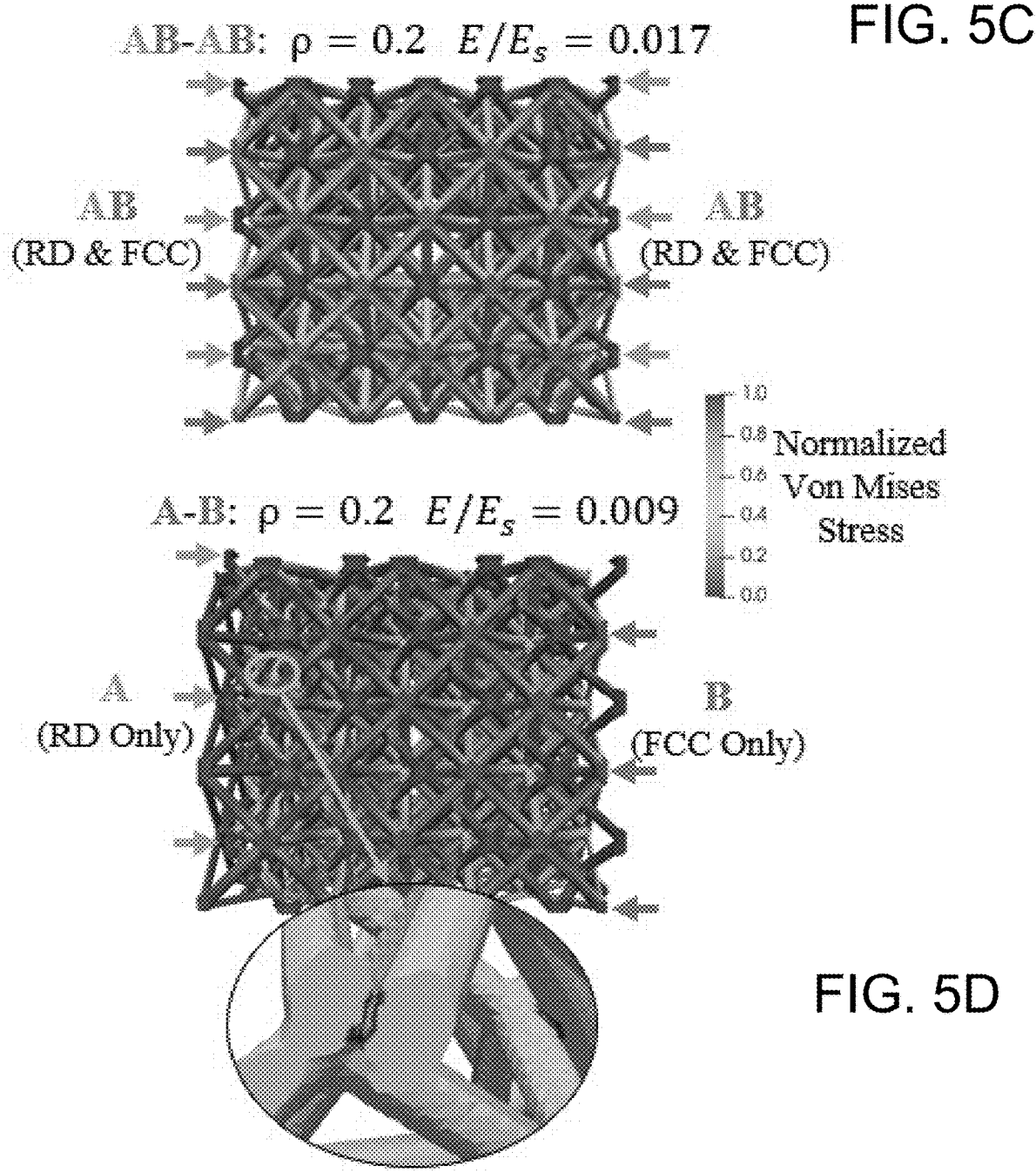
FIG. 5C shows stress distribution of an RD+FCC IPL in the AB-AB configuration after being loaded to 3% effective strain.
FIG. 5D shows stress distribution of an RD+FCC IPL in the A-B configuration after being loaded to 3% strain, with inset image of a contact point. In both simulations, the total relative density, $\rho$, was 20% and the effective moduli, E, was normalized by the modulus of the solid material, $E_s$. The Von Mises stress was normalized to the same peak value for both simulations.

Simulation and topological optimization of lattices, and IPLs in particular, is feasible although computationally expensive. The expense of direct numerical simulations comes from the large number of individual features, and the requirement for scale separation between the element size and feature size. FIGS. 5A-D show finite element simulations of the elastic response of two RD+FCC IPLs with distinct boundary loading configurations: A-B and AB-AB. Such a simulation can be useful for illustrating the role of different boundary configurations, and also for interpreting the elastic deformation response associated with the electromechanical force transduction (FIG. 3A). In this simulation with 1.7 million elements, the IPLs were compressed to 3% effective strain using an explicit-dynamics simulation with mass-scaling. Explicit dynamics is necessary because of the many contact points between the A and B lattices. The lattice's effective modulus and density is shown in FIGS. 5C and 5D. In both simulations, the stiffer B lattice carries a majority of the load. In the AB-AB configuration, the two lattices do not come into contact and both deform uniformly at the mesoscale aside from edge effects, as shown in FIG. 5C. However, in the A-B configuration, only the A lattice is loaded on one side and only the B lattice is loaded on the other. As a result, the more compliant A lattice bears all of the force for the first partial unit cell of engagement, causing a substantial localization of stress, as shown in FIG. 5D. As shown in the preceding deformation experiment (FIG. 4), such localization can be significantly mitigated during deformation and failure when both lattices transfer load.

Figure 6A:
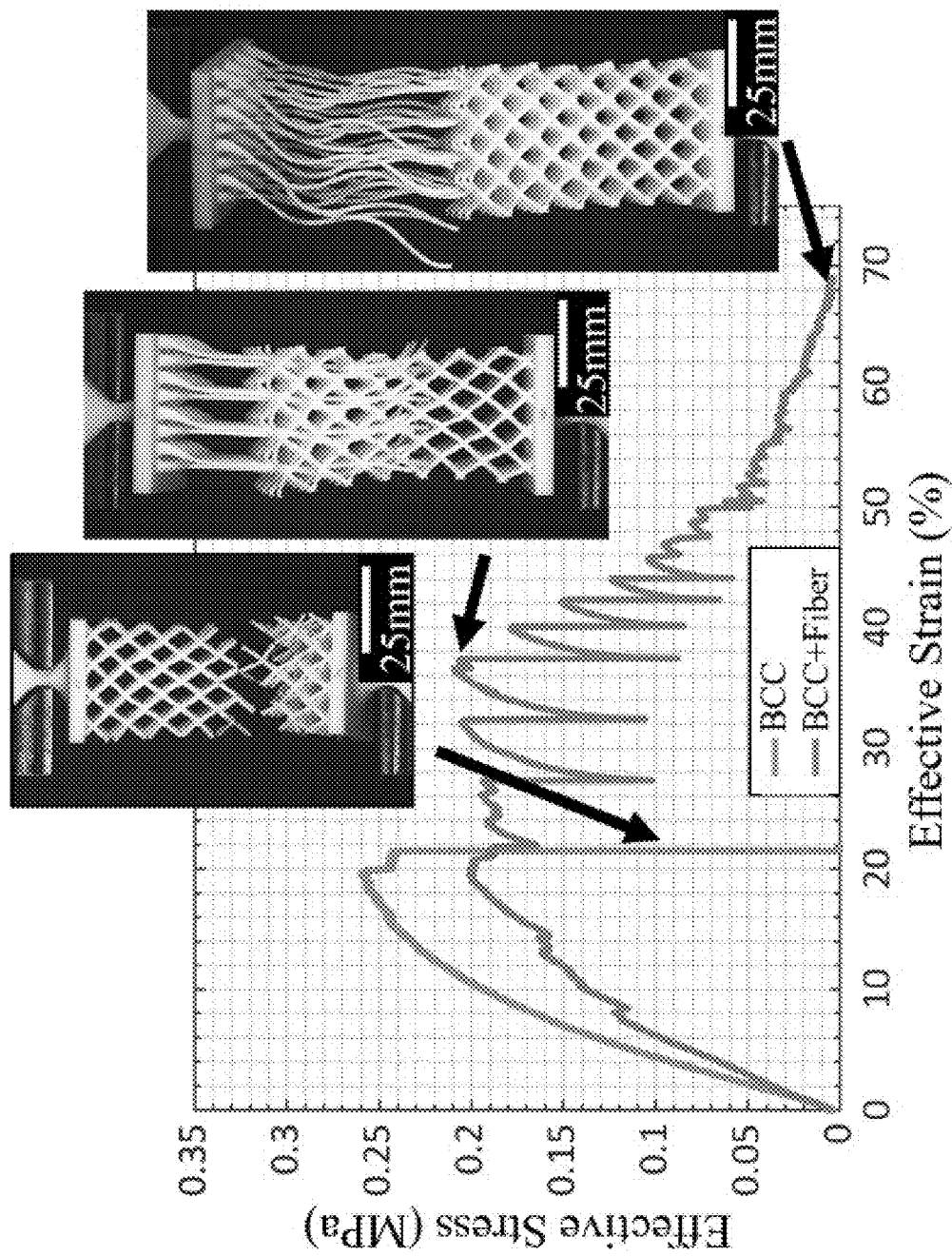
FIGS. 6A and 6B illustrate the use of interpenetrating lattices to mitigate catastrophic failures.
Figure 6B:
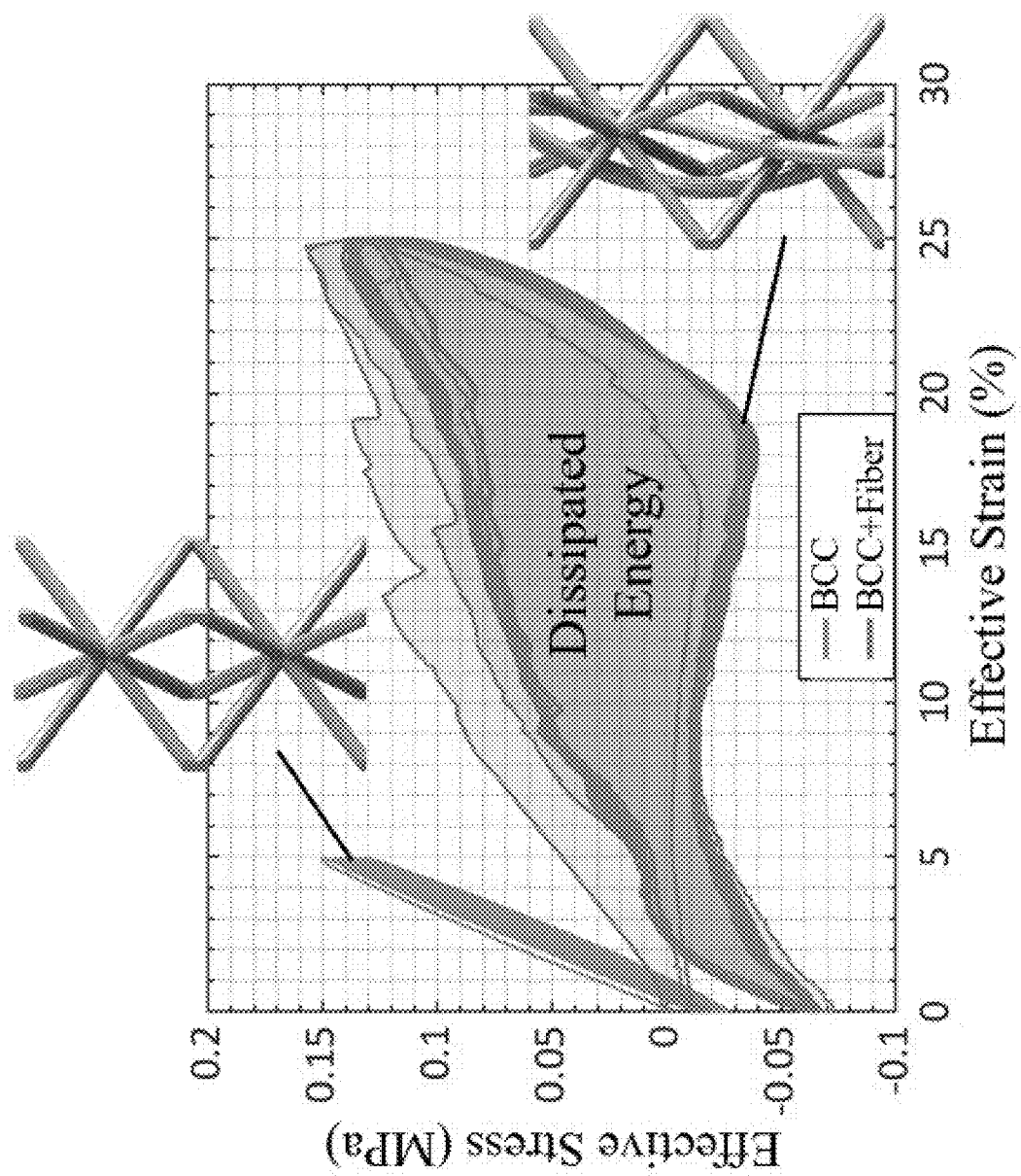

The preceding results focused on the performance of the RD+FCC IPL, but there are innumerable interpenetrating topologies possible, each with potentially unusual or beneficial properties. As another example, the tensile response of a BCC+Fiber IPL, shown in FIG. 2B, was examined. Tensile testing was performed on 10% total relative density BCC+Fiber IPLs in the A-B configuration, and 10% dense BCC control lattices printed in the same brittle photocuring polymer. While four tests were performed on each structure, the resulting behavior was consistent enough to merit plotting only one representative sample to more clearly illustrate the salient features of the data. In the A-B loading configuration there is no direct material pathway between the loading boundaries, so loads were transferred solely through friction and contact, giving the BCC+Fiber IPL significantly higher elongation and toughness than the traditional BCC lattice. Despite having equal effective density, the BCC+Fiber lattice dissipated 60% more energy per unit mass or volume. This interface-dominated behavior is analogous to plastic deformation or to molecular sliding mechanisms associated with Van Der Waals forces in polymers. However, unlike plastic deformation or fracture, friction is more repeatable and much less damaging. In fact, the BCC+Fiber IPL can be completely separated as shown in the inset images in FIG. 6A, without any permanent damage to either of the constituent lattices. The control BCC lattice, on the other hand, can only dissipate energy through the limited visco-elastic nature of its base material and through fracture, resulting in lower static energy absorption and almost zero cyclic energy dissipation where fracture is not sustainable, as shown in FIG. 6B. The BCC+Fiber IPL also shows multi-stable behavior with periodic negative stiffness occurring at integer multiples of the BCC cell length as fibers slip to new equilibrium positions.

Taxonomy of IPL Geometric Parameters

The above description focused on illustrating the unusual mechanical characteristics of a few specific IPL geometries. The interpenetrating lattice design space however is much larger, encompassing traditional lattice geometries, as well as new topologies unachievable with single component lattices. The description below expands beyond these two specific architectures to consider the overall range of geometric structures that are possible with IPLs, and their potential unusual behaviors. By exploring and broadening this design space, the discovery and implementation of new IPL topologies with useful properties is possible.

Interpenetrating lattices can be grouped into two categories based on the geometric relationships between the constituent lattices: dual lattices based on dual polyhedra that must abide by strict symmetry rules, and non-dual IPLs with relaxed, or even no symmetry rules. Further, for each combined unit cell topology, the lattices can be arranged in a multitude of configurations, both at the exterior boundaries, and within the IPLs. Both the IPL unit cell topologies, and their relative arrangements affect the ultimate properties of the IPL material.

Dual lattices, based on the ancient idea of dual polyhedra, are attractive because their polyhedral unit cells are most similar to traditional single component lattices, making them easily adaptable to traditional lattice design and AM methods. Furthermore, constituent lattice feature separation is maximized in dual lattice systems, where the required symmetries place the struts for the second dual polyhedra cell perpendicular to and at the center of the first polyhedra's faces. While all polyhedra have Archimedean duals, other properties such as space filling and nodal connectivity are equally important when designing functional lattices. Consider the self-dual tetrahedra, which cannot tesselate to fill 3D space; or the cube-octahedron pair, which though the cube readily fills space would produce only low connectivity lattices. See M. Senechal, *Math. Mag.* 54(5), 227 (1981). Lower connectivity lattices including the RD (connectivity, Z=6), have lower specific strengths and stiffnesses and deform by strut bending. High connectivity lattices such as the FCC (Z=12) have higher strength and stiffness, deforming primarily by tensile elongation of the struts, but suffer from unstable buckling failures. See R. Mines, *Metallic Microlattice Structures: Manufacture, Materials and Application*, Springer, Cham (2019).

Figure 7A:
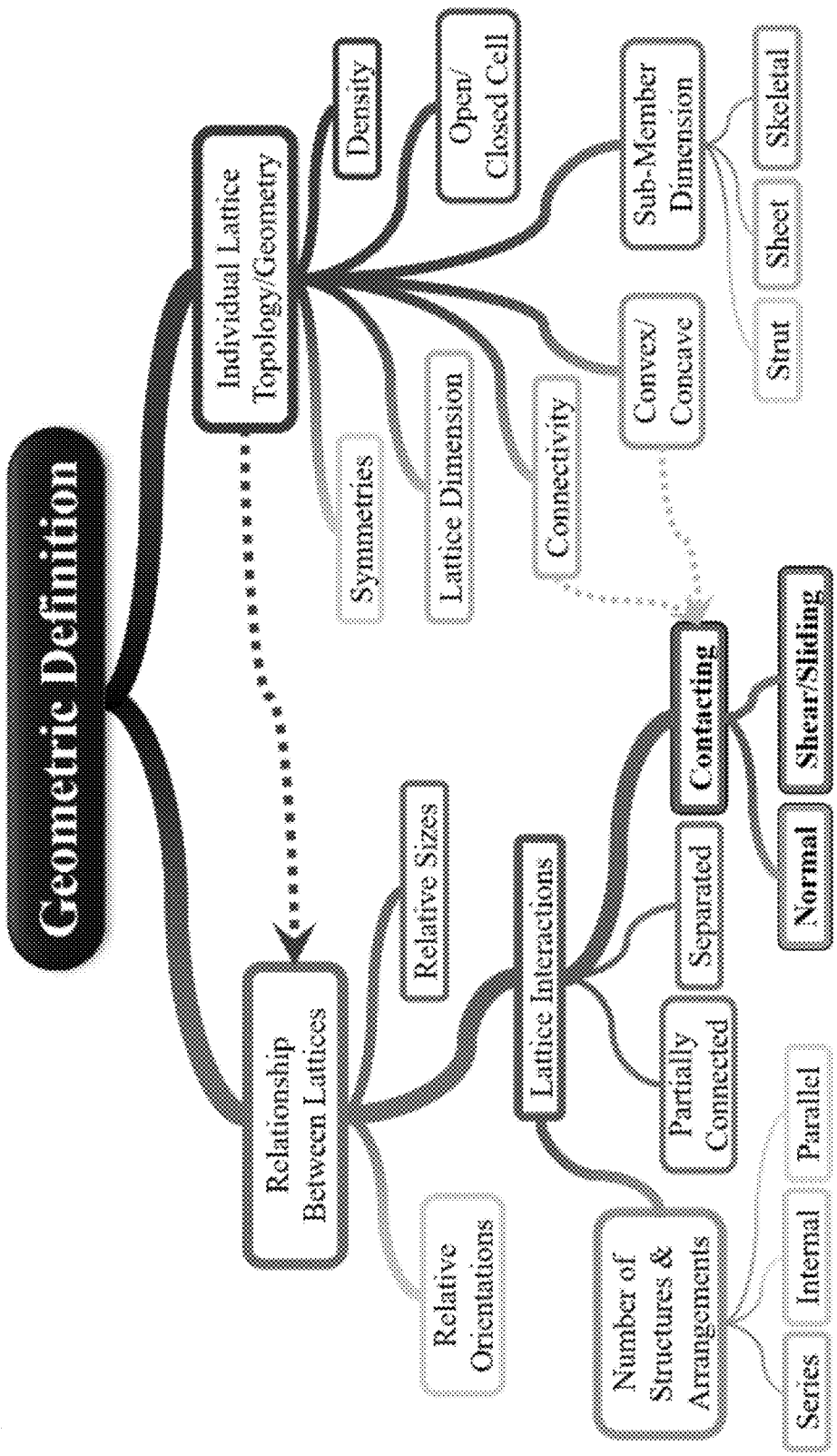
FIG. 7A is a chart of geometric features that define interpenetrating lattice structures.
Figure 7C:
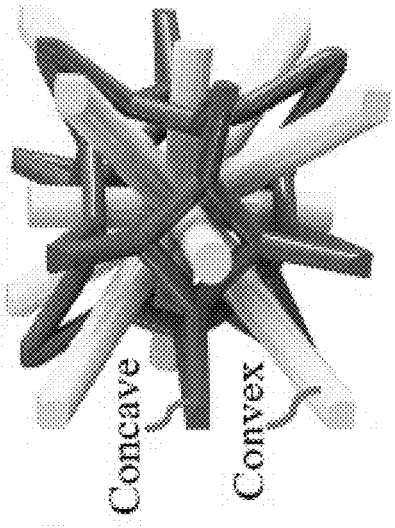
FIGS. 7B-G show examples of interpenetrating lattice structures demonstrating key geometric features.
Figure 7E:
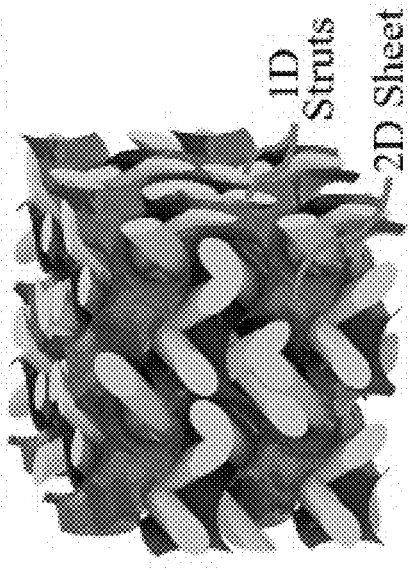
Figure 7B:
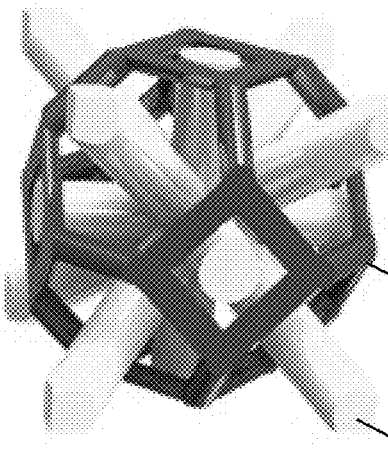
Figure 7D:
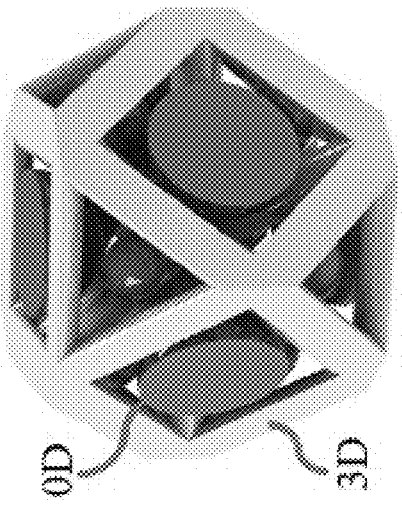

Since dual polyhedra share a geometric center, at most only one of the dual lattices can be connected through the center to produce a high connectivity stretch dominated lattice. The truncated octahedron (TO) and tetrakis cube (TC) dual pair illustrated in FIG. 7B, provides another example of this. Like the RD+FCC paring, shown in FIG. 1A, the TO+TC tiles 3D space and consists of both a stiff stretch dominated TC (Z=14) and a bending dominated TO (Z=4). By combining stretch and bending dominated lattices, classic composite toughening mechanisms can be exploited to produce stiff and strong composite metamaterials, while mitigating the unstable failures of stretch dominated lattices. The composite IPL, though similar to classical composites, derives its properties solely from topology instead of the use of different materials, allowing single material printers to make composite metamaterials. Furthermore, unlike traditional composites where the different materials are segregated, IPLs can be quasi-homogenous in nature with each component occupying the same unit cell volume, thus eliminating problems such as stress concentrations and interfacial debonding. Using two lattices instead of one, however, means that each lattice must be only half (on average) the density of the combined IPL, making them more susceptible to non-linear density scaling effects. The bending dominated RD lattice, for example, losses stiffness quadratically with decreasing density, so a 10% dense RD lattice has only one quarter the stiffness of a 20% dense RD lattice. See K. G. Prashanth et al., *Technologies* 4(4), 34 (2016); S. Babaee et al., *Acta Mater.* 60(6-7), 2873 (2012); and T. J. Horn et al., *Addit. Manuf.* 1, 2 (2014).

Figure 7G:
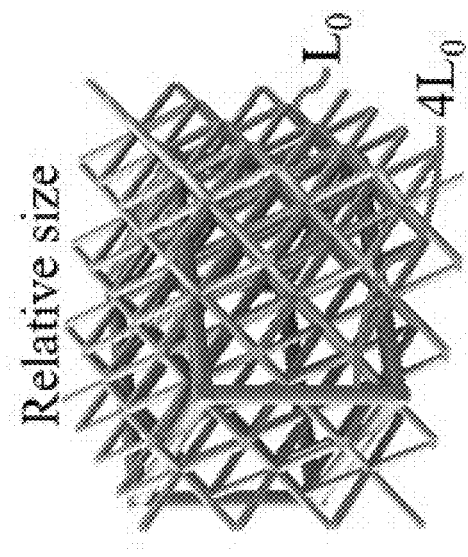
Figure 7F:
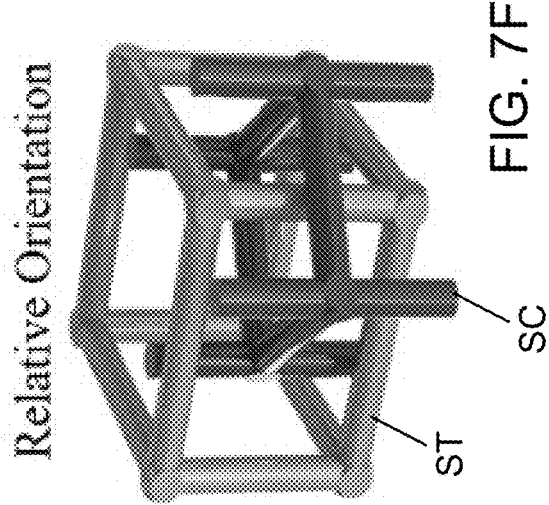
Figure 7H:
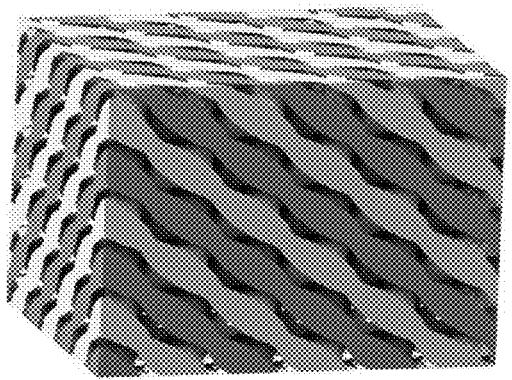
FIG. 7H shows a Schwarz D dual IPL.

While the symmetry of dual polyhedra is philosophically and aesthetically pleasing, the geometric relationships between interpenetrating lattices need not be so rigidly defined. Some of the key features that define the broader range of IPLs are laid out in FIG. 7A, with two distinct branches defining the geometry of the individual lattices, and the relationships between the two lattices. Being closed cell is the only feature that can categorically disqualify a lattice from being interpenetrated, though certain values of other features may be incompatible; for example, the sum of the relative densities of the interpenetrating structures may not exceed 100%. While dual lattices have the same symmetries, relative sizes and orientations, dimensionality, and convexity, none of these features are required. The BCC+Fiber lattice shown in FIG. 1B and FIG. 6A is an excellent example of lattices with different connectivity, where the Fiber lattice has no 3D connectivity, allowing it to slide relative to the BCC lattice. FIGS. 7B-G show examples of interpenetrating structures that result from creatively varying some of the geometric features outlined in FIG. 7A. An IPL based on the dual TO+TC, with the truncated octahedron modified to become re-entrant (concave) is expected to produce cells with positive and negative Poisson's ratio (FIG. 7C). See R. Lakes and R. Witt, *Int. J. Mech. Eng. Educ.* 30(1), 50 (2002). New topologies unachievable using single component design such as a lattice of unconnected zero-dimensional (0D) spheres (FIG. 7D) or fibers become possible using IPLs thanks to the structure provided by the second lattice. A gyroid lattice composed of a single 2D sheet can be interpenetrated by two separate lattices composed of 1D struts on either side of the sheet (FIG. 7E). FIG. 7F shows simple cubic (SC) and simple tetragonal (ST) cells with different relative orientations. By altering the relative orientations, weak shear planes such as those in the cubic or tetragonal lattices can be offset by 45 degrees, possibly increasing their resistance to catastrophic failure. FIG. 7G illustrates a lattice comprising four BCC cells nested inside a lattice comprising a single larger ST cell. The different sizes of unit cells can affect load distribution between the two lattices, which could be particularly important in fracture applications. See I. J. Gibson and M. F. Ashby, *Cellular Solids: Structure and Properties*, $2^{nd}$ Ed. Cambridge (1997). While in the preceding examples, IPLs are constructed from strut-based lattices, it is also possible to construct IPLs from other repeating 3D architectures. Any triply periodic minimal surface serves the purpose of separating two volumes. Therefore, the dual of inverse of any triply periodic minimal surface of finite thickness, δ, is two independent lattices whose separation distance is δ. An example of such an IPL constructed from the dual of a Schwarz D triply periodic minimal surface is shown in FIG. 7H.

Manufacturability of IPLs

In practice some of these topologies are more easily manufacturable than others with current printer technology. There are three primary considerations with respect to IPL printability: (1) minimum feature size/minimum feature spacing (gaps), (2) surface topography, and (3) ability to print freestanding features. While all traditional lattices are also subject to these constraints the increased design freedom of IPLs can more easily push against the edge of printing capability. As with traditional single component lattices, the minimum feature size determines the maximum number of unit cells contained in a part, but it is often the ratio of the minimum feature size to the overall build volume that is most limiting in this regard. In the polyjet and LPBF processes described herein, the minimum feature size is ~0.5 mm and the maximum build width is ~200 mm, creating a practical limit of ~40 unit cells along the build width. As printer technology advances, the ratio of resolution to build volume, and build speed are also increasing, making all lattices more attractive. Related to minimum feature size is the minimum gap between features, which is much more important for interpenetrating lattices than for single component lattices, because fusion between the closely spaced interpenetrating struts results in a single lattice instead of two separate bodies. Surface topography, or roughness is also related to minimum feature size because as struts decrease toward the minimum feature size, there tends to be an increasing effect of imperfect surface topography. See A. M. Roach et al., *Addit. Manuf.* 32, 101090 (2020). The surface roughness causes a deviation from the ideal smooth surface often represented in modeling, and as a result the effective mechanical properties can become diminished. See A. D. Dressler et al., *Addit. Manuf.* 28, 692 (2019). In the case of IPLs where surface interactions such as friction dominate behavior, the surface roughness is expected to be strongly influential. Finally, there is a geometric consideration of printing freestanding or sloped features. For AB-AB IPLs, both lattices are attached to the bottom plate and are expected to print in all technologies and orientations. However for A-B IPLs (FIGS. 2A-D) print orientation must be considered more carefully as some print orientations would need to initiate a component lattice at an intermediate build height, while other orientations can keep both lattices grounded on the build plate. The polyjet process, since it encases the entire print in a solid, gel-like support is perhaps the most capable platform in this regard. However, anecdotal evidence suggests that even the LPBF process can print these freestanding features more easily when there is a proximate surrounding structure, such as the case with a primary and secondary lattice, where the first lattice started on the build plate protects the new free standing features.

Figure 1C:
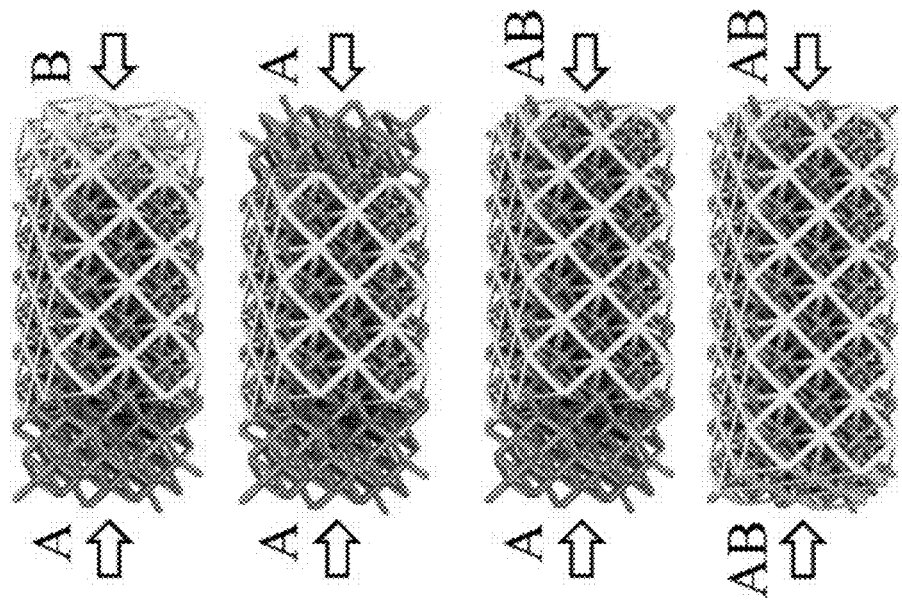
FIG. 1C illustrates the four principal boundary configurations, using the RD+FCC IPL.
Figure 2A:
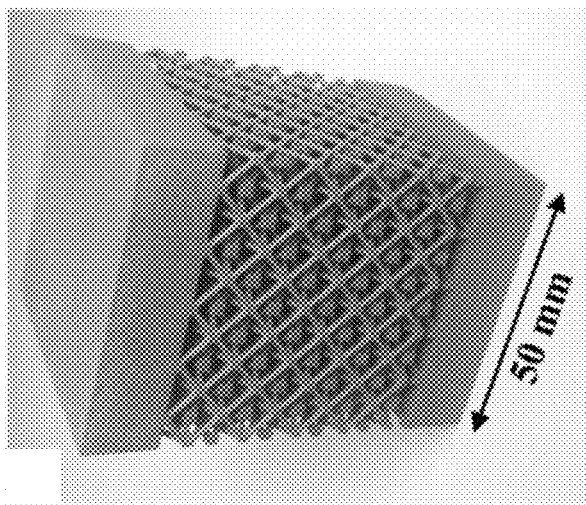
FIGS. 2A-D illustrate 5×5×5 RD+FCC interpenetrating lattices printed using four different materials and additive manufacturing (AM) processes.
Figure 2B:
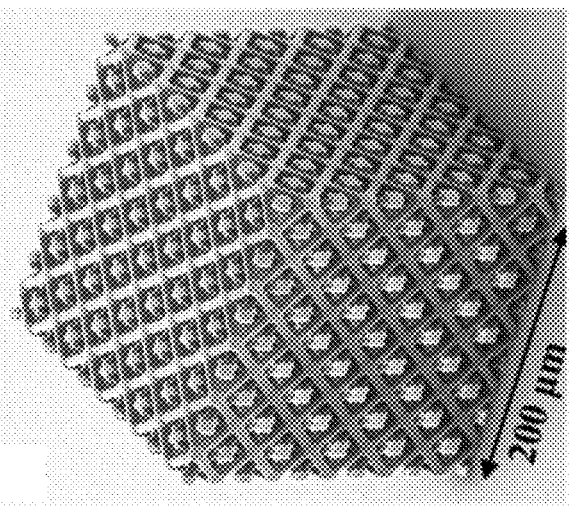
Figure 2C:
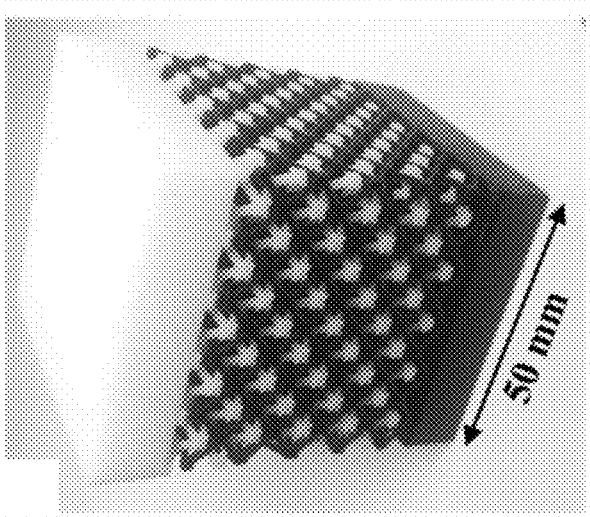
Figure 2D:
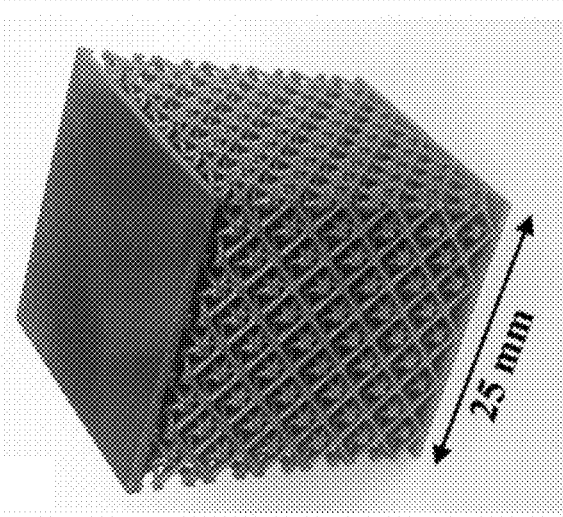
Figure 8C:
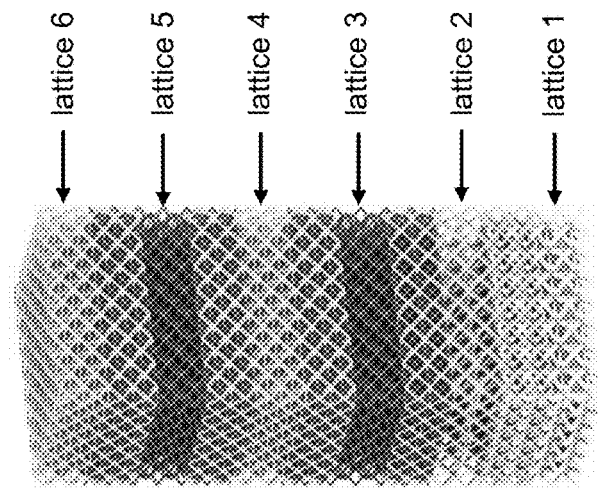
FIGS. 8A-D illustrate different interpenetrating lattice arrangements.
Figure 8B:
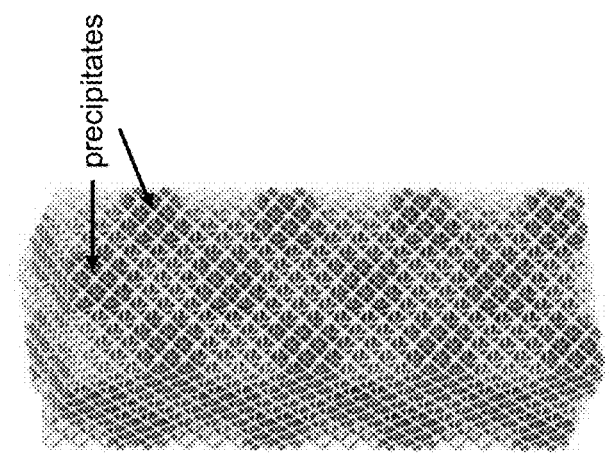
Figure 8A:
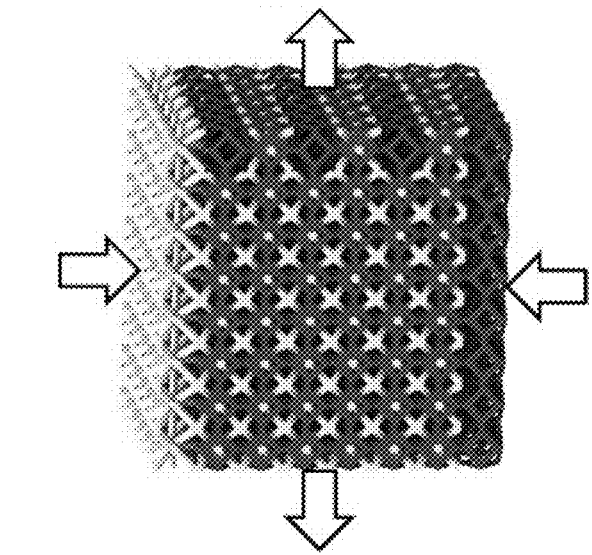
Figure 8D:
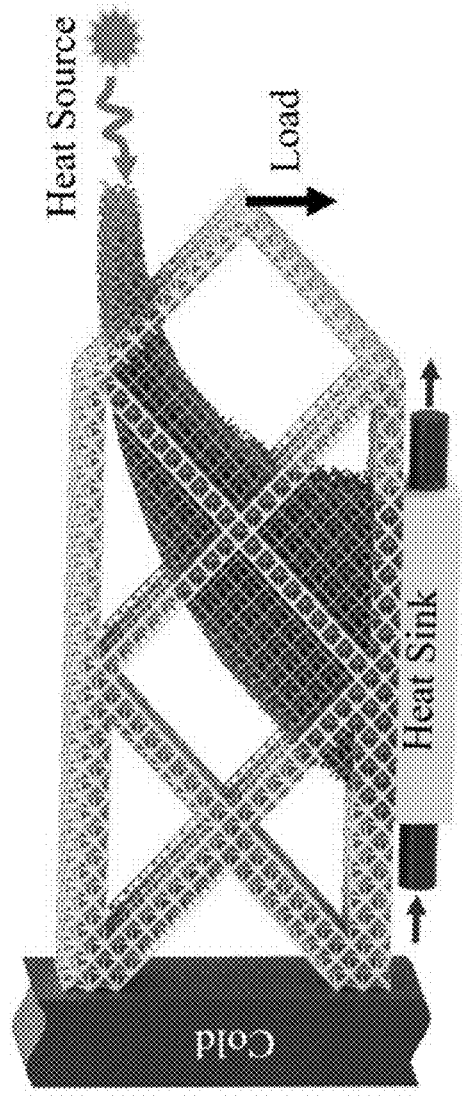

For any of these topologies the lattices can be arranged at the exterior loading boundaries to induce contact-dominated, or simple superposition-dominated properties, as described in FIG. 1C. The boundary configurations however can be generalized to multiaxial loading as shown in FIG. 8A, and in fact each boundary need not be only A, B or both, but can contain any number of nodes from each lattice, allowing for fractional engagement. By controlling the nodes at each boundary, the anisotropy of IPLs can be tuned over orders of magnitude, as shown by the difference in electrical conductivity between the A-B and AB-AB configuration RD+FCC lattices in FIG. 3A. Furthermore, the properties of each lattice, though fundamentally different, can be made even more disparate or more similar by changing the strut diameters of the sublattices independent from one another. Internal arrangements, such as strengthening "precipitates" and IPLs connected in series, shown in FIG. 8B and FIG. 8C, respectively, will result in yet different behaviors, expanding the design space further still. Since each lattice connection results in an additional contact interface, interface dominated behaviors like electrical conductivity should show more sensitivity to additional connections. IPLs can also be used to create structures with different functions that nominally occupy the same volume (FIG. 8D), essentially adding a fourth dimension to the 3D design space.

Examples of Other Potential Applications for IPLs

Using these design principles, it is possible to imagine IPLs with numerous unusual mechanical, thermal, chemical or electrical functions as well as coupled behaviors. For example, vibration isolation could be achieved by decoupling loading boundaries as in FIG. 1C, or by employing particle or tuned mass dampers in the form of trapped spheres, as in FIG. 7D. The composite toughening mechanisms already demonstrated will also increase the fracture toughness and durability of lattices by distributing the concentrated loads that occur around indentations and cracks. Computational work on similar 2D superimposed lattices shows a similar toughening benefit. See H. C. Tankasala and N. A. Fleck, *Int. J. Solids Struct.* (2019). Since the IPL constituent lattices can move relative to each other it is possible to construct dynamic particle filters that can adjust orifice size, break down particles or help to free clogged filters without removing them from service. Finally, the extremely high surface area of lattices, and the controllable separation distance between IPL constituent lattices offer tantalizing possibilities as capacitors, battery electrodes, magnetic or electrostatic actuators, or electrolytic reactors. While a host of additional applications not imagined here may prove to be equally exciting, these examples illustrate the breadth of potential applications for this new structural metamaterial design space.

The present invention has been described as structural metamaterials comprising interpenetrating lattices. It will be understood that the above description is merely illustrative of the applications of the principles of the present invention, the scope of which is to be determined by the claims viewed in light of the specification. Other variants and modifications of the invention will be apparent to those of skill in the art.

correspond to the faces of the other polyhedron and both polyhedra have the same symmetry.

2. The structural metamaterial of claim 1, wherein the reciprocal lattices comprise a rhombic dodecahedron lattice as a dual to a face-centered cubic lattice.

3. The structural metamaterial of claim 1, wherein the reciprocal lattices comprise a truncated octahedron as a dual polyhedron to a tetrakis cube.

4. A structural metamaterial, comprising two or more interpenetrating lattices that are physically separate but interact with each other either through a separation distance or through contact, wherein the two or more interpenetrating lattices comprises a Wigner-Seitz cell.

5. The structural metamaterial of claim 4, wherein the Wigner-Seitz cell comprises an face-centered cubic lattice or a body-centered cubic lattice.

6. A structural metamaterial, comprising two or more interpenetrating lattices that are physically separate but interact with each other either through a separation distance or through contact, wherein the two or more interpenetrating lattices comprise a simple cubic cell and a simple tetragonal cell with different relative orientations.

7. A structural metamaterial, comprising two or more interpenetrating lattices that are physically separate but interact with each other either through a separation distance or through contact, wherein the two or more interpenetrating lattices have different relative sizes.

8. The structural metamaterial of claim 7, wherein the two or more interpenetrating lattices comprise four body-centered-cubic cells nested inside a single larger simple tetragonal cell.

9. A structural metamaterial, comprising two or more interpenetrating lattices that are physically separate but interact with each other either through a separation distance or through contact, wherein at least one of the two or more interpenetrating lattices comprises a negative Poisson's ratio cell.

10. The structural metamaterial of claim 9, wherein the two or more interpenetrating lattices comprise a convex tetrakis hexahedron cell and a concave truncated octahedron cell.

TABLE 1

Additive manufacturing platforms, materials, and sizes used to print interpenetrating lattices

| AM Process | Manufacturer and Printer Model | Material | Lattice Geometry | Strut Diameter (mm) | Total Relative Density | Experiments Performed | FIGS. |
|---|---|---|---|---|---|---|---|
| Laser powder bed fusion | 3D Systems ProX DMP200 | 316L | RD + FCC | 0.56 | 20% | Resistivity change under mechanical load | 2C, 3 |
| Polyjet | Stratasys Ltd. Objet 30 | Vero ™ White | RD + FCC | 1.4 | 20% | Static tension/ compression, fatigue | 2A, 4, 5 |
|  |  |  | RD | 1.4 | 20% |  | 4, 5 |
|  |  |  | FCC | 1.4 | 20% |  | 4, 5 |
|  |  |  | BCC | 1.5 | 10% |  | 6 |
|  |  |  | BCC + fiber | 1.5 | 10% |  | 6 |
| Multi-photon lithography | Nanoscribe Inc. Nanoscribe GT | IP-S photoresist | RD + FCC | 0.004 | 20% | N/A | 2D |
| Multi-jet fusion | HP Jet Fusion 580 | PA12 | RD + FCC | 1.4 | 20% | N/A | 2B |

We claim:

1. A structural metamaterial, comprising two or more interpenetrating lattices that are physically separate but interact with each other either through a separation distance or through contact, wherein the two or more interpenetrating lattices comprise two reciprocal lattices constructed from a pair of polyhedra wherein the vertices of one polyhedron 11. A structural metamaterial, comprising two or more interpenetrating lattices that are physically separate but interact with each other either through a separation distance or through contact, wherein at least one of the two or more interpenetrating lattices comprises a symmetry-less amorphous structure.

12. A structural metamaterial, comprising two or more interpenetrating lattices that are physically separate but interact with each other either through a separation distance or through contact, wherein at least one of the two or more interpenetrating lattices comprises a packing of spheres.

13. A structural metamaterial, comprising two or more interpenetrating lattices that are physically separate but interact with each other either through a separation distance or through contact, wherein at least one of the two or more interpenetrating lattices comprises a sheet-based lattice.

14. The structural metamaterial of claim 9, wherein the sheet-based lattice comprises a gyroid.

15. A structural metamaterial, comprising two or more interpenetrating lattices that are physically separate but interact with each other either through a separation distance or through contact, wherein the two or more interpenetrating lattices comprise a periodic lattice interpenetrated with symmetric wavy fibers.

16. The structural metamaterial of claim 15, wherein the two or more interpenetrating lattices comprise a body-centered cubic lattice with interpenetrating periodic fibers.

17. A structural metamaterial, comprising two or more interpenetrating lattices that are physically separate but interact with each other either through a separation distance or through contact, wherein the two or more interpenetrating lattices are externally loaded independent of each other.

18. A structural metamaterial, comprising two or more interpenetrating lattices that are physically separate but interact with each other either through a separation distance or through contact, wherein the two or more interpenetrating lattices comprise different interior lattice configurations.

19. A structural metamaterial, comprising two or more interpenetrating lattices that are physically separate but interact with each other either through a separation distance or through contact, wherein the two or more interpenetrating lattices comprise two volumes separated by a triply periodic surface.

20. The structural metamaterial of claim 19, where the two volumes are separated by a Schwarz D triply periodic surface.

* * * * *